USO10502959B2

(12) United States Patent
Stafford et al.

(10) Patent No.: US 10,502,959 B2
(45) Date of Patent: Dec. 10, 2019

(54) REALTIME LENS ABERRATION CORRECTION FROM EYE TRACKING

(71) Applicant: Sony Interactive Entertainment Inc., Tokyo (JP)

(72) Inventors: Jeffrey Roger Stafford, Redwood City, CA (US); Eric Larsen, Redwood City, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/351,466

(22) Filed: Mar. 12, 2019

(65) Prior Publication Data

US 2019/0250409 A1    Aug. 15, 2019

Related U.S. Application Data

(63) Continuation of application No. 14/835,558, filed on Aug. 25, 2015, now Pat. No. 10,228,562.

(60) Provisional application No. 62/058,057, filed on Sep. 30, 2014.

(51) Int. Cl.
*G02B 27/00* (2006.01)
*G02B 27/01* (2006.01)

(52) U.S. Cl.
CPC ..... *G02B 27/0172* (2013.01); *G02B 27/0068* (2013.01); *G02B 27/0093* (2013.01); *G02B 2027/011* (2013.01); *G02B 2027/014* (2013.01); *G02B 2027/0138* (2013.01); *G02B 2027/0187* (2013.01)

(58) Field of Classification Search
CPC ...... G02B 2027/011; G02B 2027/0138; G02B 2027/014; G02B 2027/0187; G02B 27/0068; G02B 27/0093; G02B 27/0172
See application file for complete search history.

(56) References Cited

U.S. PATENT DOCUMENTS

| 5,864,342 A * | 1/1999 | Kajiya | G06T 11/001 |
| | | | 345/418 |
| 2013/0016413 A1* | 1/2013 | Saeedi | G02B 27/0172 |
| | | | 359/205.1 |
| 2014/0009368 A1 | 1/2014 | Hirota | |
| 2015/0077312 A1* | 3/2015 | Wang | G02B 27/017 |
| | | | 345/7 |

* cited by examiner

*Primary Examiner* — LaTanya Bibbins
(74) *Attorney, Agent, or Firm* — Penilla IP, APC

(57) ABSTRACT

Systems and methods include receiving an image for presenting on a display screen of a head mounted display (HMD). The image is provided by an application. The received image is pre-distorted to enable optics provided in a HMD to render the image. An alignment offset is identified for an eye of a user wearing the HMD by determining a position of the eye relative to an optical axis of at least one lens of the optics of the HMD. The pre-distorted image provided by the application is adjusted to define a corrected pre-distorted image that accounts for the alignment offset. The corrected pre-distorted image is forwarded to the display screen of the HMD for rendering, such that the image presented through the optics of the HMD removes aberrations caused by the alignment offset.

17 Claims, 12 Drawing Sheets

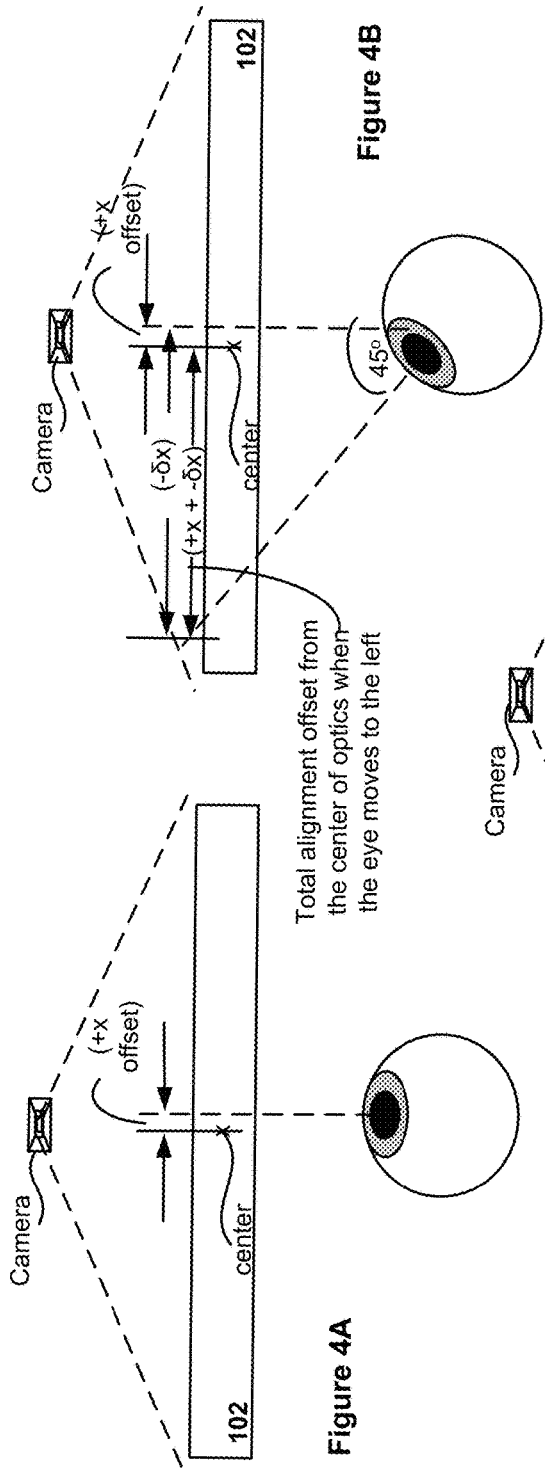
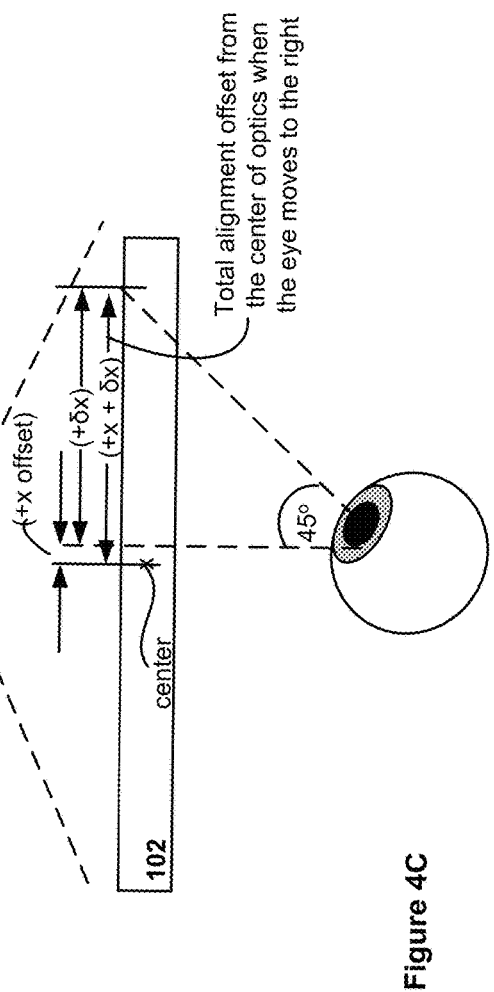
Figure 4A
Figure 4B
Figure 4C

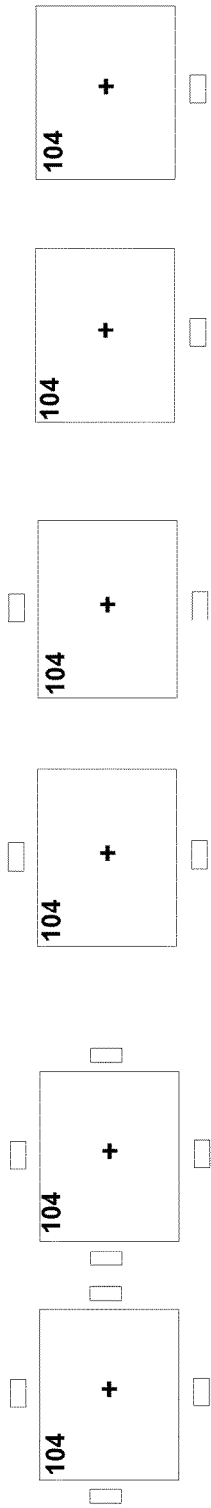
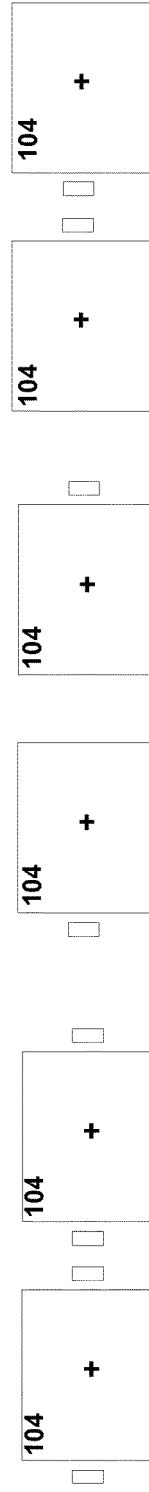
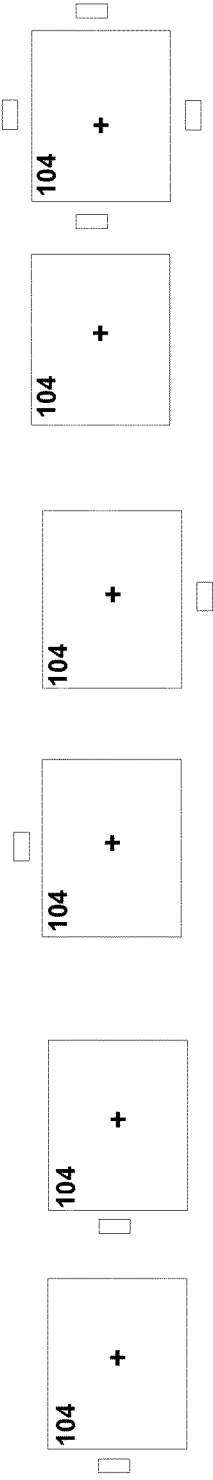
Figure 5A  Figure 5B  Figure 5C
Figure 5D  Figure 5E  Figure 5F
Figure 5G  Figure 5H  Figure 5I

REALTIME LENS ABERRATION CORRECTION FROM EYE TRACKING

CLAIM OF PRIORITY

This application is a continuation of and claims priority under 35 U.S.C. § 120 to U.S. patent application Ser. No. 14/835,558, filed on Aug. 25, 2015, and entitled, "REALTIME LENS ABERRATION CORRECTION FROM EYE TRACKING," which claims priority under 35 U.S.C. § 119 to U.S. Provisional Patent Application No. 62/058,057, filed on Sep. 30, 2014, and entitled "REALTIME LENS ABERRATION CORRECTION FROM EYE TRACKING", which are incorporated herein by reference in their entirety.

CROSS REFERENCE TO RELATED APPLICATIONS

This application is related to U.S. application Ser. No. 14/187,127, filed on Feb. 21, 2014, and entitled "DIGITAL INTER-PUPILLARY DISTANCE ADJUSTMENT," U.S. application Ser. No. 14/225,408, filed on Mar. 25, 2014, and entitled "SYSTEMS AND METHODS FOR CUSTOMIZING OPTICAL REPRESENTATION OF VIEWS PROVIDED BY A HEAD MOUNTED DISPLAY BASED ON OPTICAL PRESCRIPTION OF A USER," and United Kingdom patent application No. 1410397.2 filed on Jun. 11, 2014, which are incorporated herein by reference in its entirety.

BACKGROUND

1. Field of the Invention

The present invention relates to methods and systems for adjusting image provided to a head-mounted display based on eye tracking.

2. Description of the Related Art

The video game and computer industry, in general, has seen many changes over the years. As computing power has expanded, developers of video games/applications have likewise created game and other software that takes advantage of these increases in computing power. To this end, video game and application developers have been coding games and applications that incorporate sophisticated operations and mathematics to produce a very realistic game/application experience.

A growing trend in the computer gaming industry is to develop games, game controllers and head-mounted or head-coupled displays (HMD) that increase the interaction between user and the computing system. The game controllers, for example, include features that enable richer interactive experience by allowing a gaming system to track the player's varied movements, and use these movements as inputs for a game executed on the gaming system. The head mounted displays include optics and display screens in front of one or both eyes of a user so as to provide clear three-dimensional images of an application, such as a gaming application.

To save on costs, low-cost lens optics are used for the HMD. However, these optics produce aberrations (geometric and/or chromatic) that results in the deterioration of the quality of the image viewed by a user.

It is in this context that embodiments of the invention arise.

SUMMARY

Embodiments of the present invention provide systems and methods for providing real time lens aberration correction, as described herein.

Broadly speaking, various embodiments of the invention disclose systems and methods for adjusting an image provided by an application, such as a gaming application, to a head mounted display (HMD) so as to improve the quality of the image rendered on a display screen of the HMD and viewed by a user wearing the HMD. The HMD includes lens/optics that undistorts the image presented on the screen of the HMD, for near-eye viewing. However, the image viewed by the user through the optics may be of lower quality due to aberrations, such as chromatic aberrations and/or geometric aberrations, caused by misalignment of the user's eye(s) with the optical axis of the lens of the optics provided in the HMD. In order to provide a high quality image, the image provided by the application needs to be further adjusted so as to minimize or eliminate any distortions caused by the misalignment of the user's eye(s).

Toward this end, a method is disclosed. The method includes receiving an image for presenting on a display screen of a head mounted display (HMD). The image is provided by an application. The received image is pre-distorted to enable the optics provided in a HMD to render the image. An alignment offset is identified for an eye of a user wearing the HMD by determining a position of the eye relative to an optical axis of at least one lens of the optics of the HMD. The pre-distorted image provided by the application is adjusted to define a corrected pre-distorted image that accounts for the alignment offset. The corrected pre-distorted image is forwarded to the display screen of the HMD for rendering, such that the image presented through the optics of the HMD removes aberrations caused by the alignment offset.

In one embodiment, the alignment offset is identified for both eyes of a user.

In one embodiment, the optics of the HMD is configured to provide near-eye focus.

In one embodiment, the identifying the alignment offset further includes identifying one of an x-shift, a y-shift, a z-shift, an x-and-y shift, an x-and-z shift, a y-and-z shift or an x-y-z shift.

In one embodiment, the position of the eye is captured using one or more internal sensors disposed on the HMD.

In one embodiment, the lens of the optics is one of a spherical lens, an aspherical lens, a holographic waveguide lens or any combinations thereof.

In one embodiment, identifying the alignment offset and adjusting the pre-distorted image are performed by a processor disposed within the HMD, the alignment offset is identified by tracking the position of the eye in substantial real-time as the image is being presented on the display screen of the HMD.

In one embodiment, identifying the alignment offset is performed by a processor disposed within the HMD by tracking the position of the eye in substantial real-time as the image is being presented on the display screen of the HMD and adjusting the pre-distorted image is performed by a processor of a computing device that is communicatively connected to the HMD.

In one embodiment, the alignment offset is identified by first determining shape and type of lens of the optics used in the HMD. The position of the eye is determined in relation to the optical axis of the lens of the optics provided in the HMD. Upon determination, one or more pre-defined distortion maps are selected based on the eye position. The distortion maps are provide mapping of different locations within a visible field of view of the display screen to corresponding displacement offsets. The selection is determined through triangulation. The alignment offset is computed using linear interpolation of the displacement offsets from the selected one or more pre-defined maps.

In one embodiment, the pre-defined distortion maps are two-dimensional maps that are defined for each type of lens of the optics used in the HMD and for each primary color spectrum used for presenting the image. The pre-defined distortion maps are selected based on the type of lens of the optics used in the HMD and based on each color of the primary color spectrum that needs to be adjusted.

In one embodiment, each of the pre-defined distortion maps is associated with a particular quadrant of the visible field of view or an area covering center of the visible field of view.

In one embodiment, a method is disclosed. The method includes identifying an alignment offset of an eye of a user wearing a head mounted display. The alignment offset is identified by determining a positon of the eye relative to an optical axis of at least one lens of optics provided in the HMD. A pre-distorted image of media content provided by an application for rendering on a display screen of the HMD, is adjusted. The adjusting results in generation of a corrected, pre-distorted image that accounts for the alignment offset. The corrected, pre-distorted image is sent for rendering on the display screen of the HMD, such that the image presented through the optics removes aberration caused by the alignment offset.

In one embodiment, the operations of identifying an alignment offset, adjusting a pre-distorted image and sending the corrected, pre-distorted image are performed at a frame rate at which the media content from the image is being rendered at the HMD.

Other aspects of the invention will become apparent from the following detailed description, taken in conjunction with the accompanying drawings, illustrating by way of example the principles of embodiments of the invention.

BRIEF DESCRIPTION OF THE DRAWINGS

Various embodiments of the present invention may best be understood by reference to the following description taken in conjunction with the accompanying drawings in which:

FIGS. 4A-4C illustrate exemplary top views identifying alignment offset when a user wearing the HMD moves his eyes to the right and left as determined using a camera disposed in a HMD, in accordance to some embodiments of the invention.

FIGS. 5A-5I illustrate exemplary camera and/or sensor locations for determing alignment offset of the eyes of a user wearing the HMD, in accordance with different embodiments of the invention.

DETAILED DESCRIPTION

Figure 1:
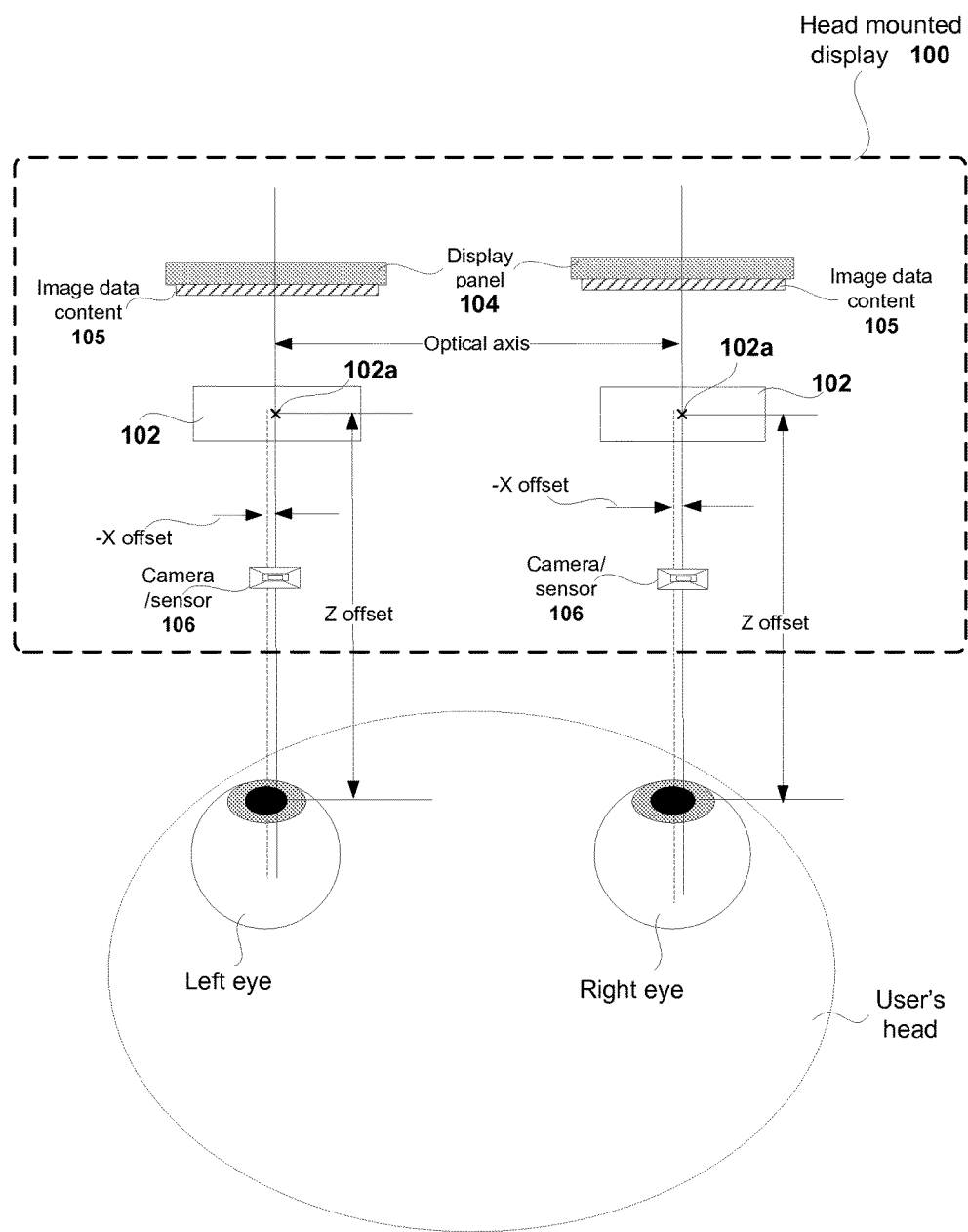
FIG. 1 illustrates an exemplary top view of a user wearing the HMD and determining different alignment offsets of the eyes of a user wearing the HMD, in accordance with some embodiments of the present invention.

Systems and methods for determining alignment offset and using the alignment offset for adjusting an image received from an application, are described. An application, such as a gaming application, executing on a computing device/console or game cloud causes images of interactive scenes of the game to be transmitted to a head mounted display (HMD) for rendering on a display screen of the HMD. The image that is transmitted is pre-distorted. The pre-distorted image is processed by optics of the HMD for near-eye view, such that when the image is viewed through the lens of the optics, the image is in-focus. The amount of pre-distortion that is applied to the image is dependent on the distance of the eye from the lens of the optics provided in the HMD. Additionally, in order to provide a clear image, alignment of the eye(s) of the user has to match the optical axis of at least one lens of optics provided in the HMD. The eye(s) of the user wearing the HMD may not be completely aligned to the optical axis provided in the HMD. As a result, the image that is presented to the display screen and viewed through the optics may include aberrations (geometrical and/or chromatic) that can lower the quality of the image rendered on the display screen of the HMD. In order to provide higher quality image, the pre-distorted image received from the application needs to be further adjusted to account for any misalignment detected in the user's eye in relation to the optical axis (i.e., optical axis). When the adjusted, pre-distorted image is processed by the optics of the HMD, the image viewed through the optics is clear and substantially free of any aberrations caused by the misalignment of the user's eye.

The alignment offset may be determine using simple form of eye-tracking. In one embodiment, the eye-tracking can be performed using a combination of hardware in the HMD, such as image sensing device and/or depth sensing device, and software within the HMD or in a computing device that is communicatively connected to the HMD. For more information about eye-tracking, reference can be made to United Kingdom application No. 1310368.4 filed on Jun. 11, 2013 and to United Kingdom application No. 1314975.2 filed on Aug. 21, 2013, which are herein incorporated by reference in its entirety. The eye-tracking tracks the position of the eye(s) of a user wearing the HMD relative to the optical axis of lens disposed in front of the eye(s). Using the relative position of the eye from the optical axis, more accurate aberration correction can be calculated in substantial real-time so as to deliver the best image quality for a user wearing the HMD. In one embodiment, the HMD can be used for presenting virtual reality (VR) images or augmented reality (AR) images. As a result, the various embodiments described herein may be applied to both the VR images and the AR images viewed through the optics of the HMD. The method of providing additional adjustment to a pre-distorted image could be used for different types and shapes of optics provided in the HMD, including spherical lens, aspherical lens or holographic waveguide lens where chromatic aberration is common due to the diffractive nature of lens.

In one embodiment, the process of eye-tracking and aberration correction could be performed on the HMD itself using a processor or custom electronics provided therein. In an alternate embodiment, the process could be performed by a computing device that is communicatively connected to the HMD, wherein the computing device may be a game console, a server device disposed within a local area network, wide area network, personal area network, other networks, or on a cloud. With the brief overview of the invention, different embodiments will now be described with reference to the various drawings.

FIG. 1 illustrates an exemplary top view of a user wearing the HMD and the different alignment shifts identified based on position of the user's eyes in relation to the optical axis of the lens of the optics provided in the HMD, in one embodiment. The head mounted display (HMD) 100 includes a display panel or display screen 104 defining a visible field of view on which image data content 105 is rendered. The image data content 105 may be provided by an application executing on a processor of the HMD or a computing device that is communicatively connected to the HMD. In one embodiment, the computing device may be a stand-alone computer or console, such as a game console, or may be part of a network, such as wide-area network, local area network, personal area network, local intranet, metropolitan area network, virtual private network, or a server accessed over the Internet, virtual server on a cloud, etc. The list of networks is exemplary and should not be considered restrictive or exhaustive.

Optics 102 are disposed in-between the display screen 104 and each of the user's eyes, as shown in one embodiment, and are used to process the image for "near-eye" focus. The near-eye focus, for example, is when the optics, disposed close to the eye, is configured to focus the image of media content on the display screen such that it appears to be at a far focal distance (for example, at least 3 m+ distance or, in some instances, at infinity) when viewed by the human eye. In an alternate embodiment, the optic may be disposed in front of only one eye (either the right or the left eye). The optics is defined using lens and may include spherical lens, aspherical lens, holographic waveguide lens, etc. The aforementioned types of optics are exemplary and other types of optics may also be used so long as they are capable of processing the media content for near-eye focus or for rendering the media content for clear viewing by the human eye.

One or more cameras or sensors 106 are provided within the HMD and are used to determine alignment offset of the user's eye(s) in relation to the optical axis 102a. The sensors may be one of an depth sensing device or a image sensing device. The depth sensing device may include a depth sensor camera, stereo three-dimensional camera, a depth sensor, a video camera, or any combinations thereof. The image sensing device includes an infra-red camera, a digital camera, an ultra-violet camera, radar device, laser device, single lens camera, or combinations thereof. The sensors 106 may be used to capture/obtain the three-dimensional information related to the position of the eye and for determining the center 102a of the optics 102 disposed in the HMD. In one embodiment, the sensors 106 may be used to determine the inter-pupilary distance (IPD) of the user's eyes and compare it to the IPD of the optics to determine if there is a shift in the alignment and, if so, in which direction(s) and by how much. In an alternate embodiment, position of an eye of a user wearing the HMD is compared with the optical center disposed in front of the eye by using virtual lines and determining if there is a shift and if so, in which direction(s) and by how much. The images, for example, captured by the sensors 106 may be used to determine only the x-shift (i.e., x offset), only the y-shift (not shown in FIG. 1), only the z-shift (i.e., z offset), etc. In the embodiment illustrated in FIG. 1, the x-shift is shown to be a negative value as the eye of the user (shown by dotted line) is shifted to the left in relation to the optical axis (shown by a solid line). If the eye of the user is correctly aligned with the optical axis, then the x-shift would be zero and if it is shifted to the right in relation to the optical axis, the x-shift would be a positive value.

Figure 2:
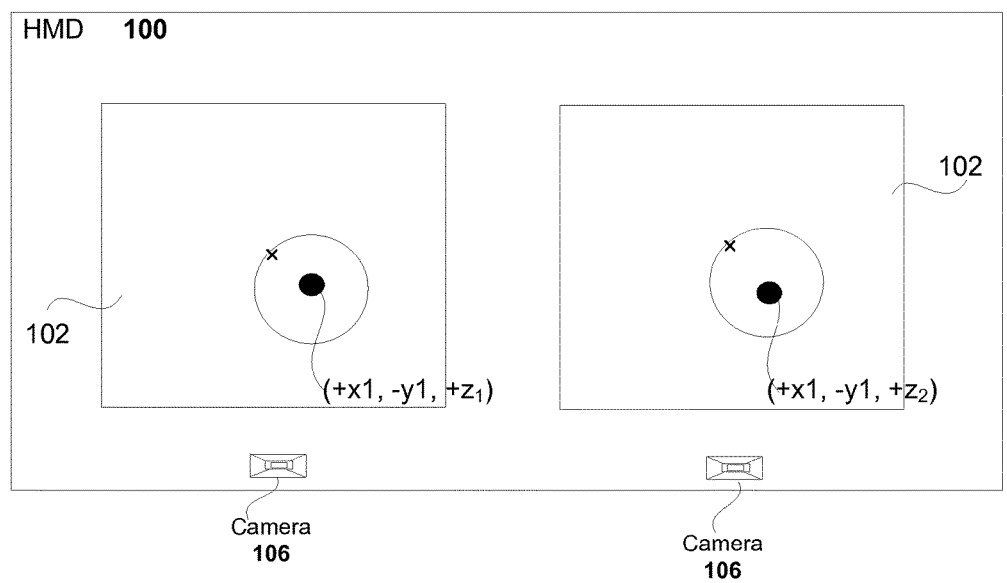
FIG. 2 illustrates an exemplary view identifying alignment offset with reference to one or both eyes of a user based on image information captured by a camera disposed in a HMD, in accordance with embodiments of the invention.

FIG. 2 illustrates an exemplary view of an alignment offset detected with reference to the position of the user's eye(s) in relation to the optical axis, in one embodiment. The camera/sensor disposed in the HMD is capable of capturing the three-dimensional information associated with the position of the user's eye(s) in relation to the optical axis of the lens of the optics disposed in the HMD. The three-dimensional information is used to determine the alignment offset of the user's eye in relation to the optical axis. In one embodiment, based on the information provided by the camera/sensor 106, the alignment offset is computed as a set of Cartesian coordinates. In the embodiment illustrated in FIG. 2, the alignment offset for the right eye as computed from the optical axis of the lens of the optics of the HMD is equal to $(+x_1, -y_1, +z_2)$ and for the left eye $(+x_1, -y_1, +z_1)$. In this embodiment, the offset associated with the right eye is not the same as the offset associated with the left eye as the x and y coordinates match but the z coordinate is different. In one embodiment, the x and y coordinates are considered to define the eye-shift and the z coordinate is considered to define the eye-relief. By determining the eye-shift and the eye-relief, most optimal distortion adjustment may be determined for the optics and applied to the image so that the image is clear when viewed through the optics of the HMD. The difference in the alignment offset in the two eyes may be due to how the HMD is balanced or positioned on the user's head. For example, the HMD may be positioned based on the user's head shape or comfort level, etc. If a user, for example, is wearing prescription glasses, the HMD may have to be positioned over the glasses, causing a change in the z-shift (eye-relief). In another embodiment, the alignment offset of the right and the left eye in relation to the optical axis may be the same. In the embodiment illustrated in FIG. 2, the x, y and z shift are being monitored.

Figure 3A:
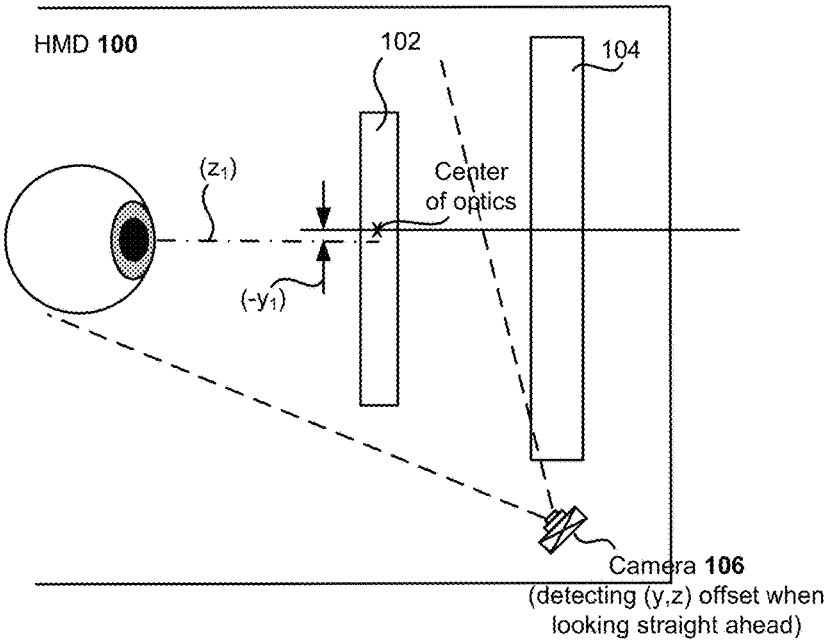
FIGS. 3A-3B illustrate exemplary side views identifying alignment offset based on the direction and line of sight of the eye(s) of a user wearing the HMD as determined using a camera disposed in a HMD, in accordance to some embodiments of the invention.
Figure 3B:
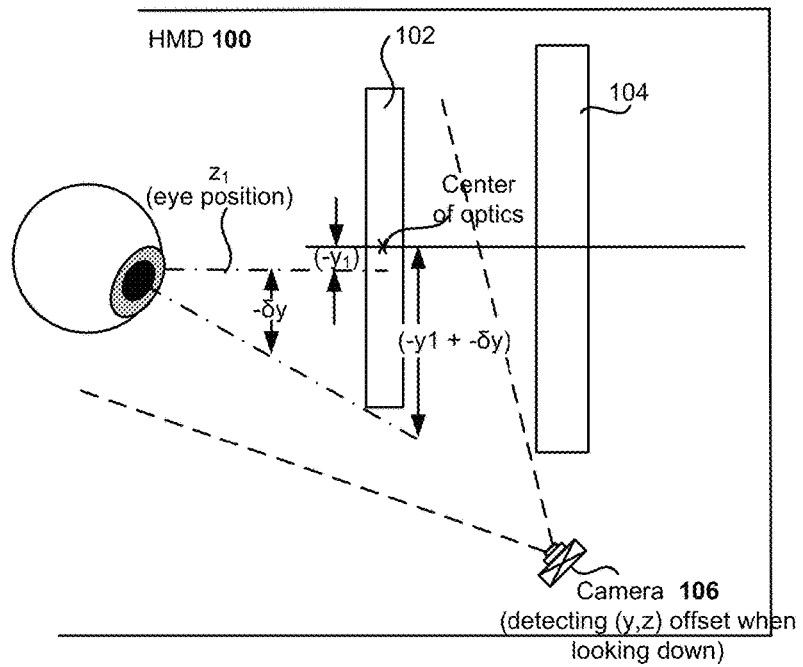

FIGS. 3A and 3B illustrate an exemplary side view of a user wearing the HMD wherein the camera/sensor 106 is used to detect the alignment offset, in another embodiment. In the embodiment illustrated in FIG. 3A, the user is looking straight ahead but the user's eye is not aligned with the optical axis. The camera/sensor 106 captures the y-offset (−y1) as shown by the shift along the y axis. The negative sign indicates that the eye of the user is aligned below the optical axis. In one embodiment, the optical axis of the lens is considered to be the center point of the lens where the (x, y, z) coordinates all converge. Consequently, the (x, y, z) coordinates for the optical axis may have a value of (0, 0, 0). When a virtual line drawn from the eye is to the left of the virtual line drawn through the center of the optic, the x-coordinate is considered to have a negative x-shift and when it is to the right, the x-coordinate is considered to have a positive x-shift. Similarly, when the line drawn from the center of the eye is above the line through the optic center, the y-coordinate is considered to have a positive y-shift and when it is below, the y-coordinate is considered to have a negative y-shift, as illustrated by $(-y_1)$ in FIG. 3A. The z-shift is computed based on how close or how far the eye ball is from the center of the optic. For example, if the HMD is positioned differently over each of the user's eyes, there might be a different z-shift with respect to the left and the right eyes. In the embodiment illustrated in FIG. 3A, the z coordinate is computed to be equal to $z_1$ for both the eyes.

FIG. 3B illustrates an embodiment wherein the user's eye position has changed and the user is looking down. In this embodiment, the camera/sensor 106 captures the additional shift ($\delta y$) in the y coordinate in the same direction (i.e., below) as the y-shift identified in FIG. 3A. In this embodiment, the y-offset based on the y-shift is computed to be $(-y_1+-\delta y)$. If, on the other hand, the y shift was in the opposite direction from the y-shift identified in FIG. 3A, the y-offset would be computed to be $(-y_1+\delta y)$. In this embodiment, as in the embodiment illustrated in FIG. 3A, the z In the embodiments illustrated in FIGS. 3A and 3B, only the y and z shift are being monitored. coordinate ($z_1$) continues to remain the same.

FIGS. 4A-4C illustrate the computation of the alignment offset for a user wearing the HMD, in another embodiment. FIG. 4A illustrates an alignment offset that is computed based on the position of the user's eye in relation to the optical axis. The alignment offset could be detected in any direction(s) depending on how the user's eye is lined up with the optical axis. In the embodiment illustrated in FIG. 4A, the alignment offset is recognized to be an offset along the x-axis due to a positive shift on the x-axis. FIG. 4B illustrates an embodiment where the alignment offset is computed based on the user's eye moving by about 45° to the left along the x-axis. In this embodiment, the alignment offset is computed as $(+x+-\delta x)$ as the shift ($\delta x$) of the eye along the x-axis is in a direction opposite to the initial eye position illustrated in FIG. 4A. Along similar lines, FIG. 4C illustrates an embodiment where the alignment offset is computed based on the user's eye moving by about 45° to the right along the x-axis. In this embodiment, the alignment offset is computed as $(+x+\delta x)$ as the shift $+\delta x$ of the eye along the x-axis is in the same direction as the initial eye position defined with reference to FIG. 4A. In the various embodiments illustrated in FIGS. 4A-4C, the offset is computed based on the information captured by a camera/sensor 106.

FIGS. 5A-5I illustrate the different embodiments identifying the locations around a visible field of view of the display screen of the HMD where one or more cameras/sensor can be disposed to capture a shift in the user's eye in relation to the optical axis. Of course, the cameras/sensors are inward facing cameras/sensors that are directed toward the eye(s) of the user when the user is wearing the HMD, and are disposed in such a manner so as to capture the relative shift in the eye position and gaze direction with respect to the optical axis disposed in the HMD while providing a unhindered view of the image rendered on the display screen of the HMD. As mentioned before, the information associated with the eye shift as captured by the one or more cameras/sensors are used to compute the alignment offset of the user's eye with reference to the optic center. When more than one camera/sensor are used, information from the multiple cameras/sensors are blended/merged/averaged to determine the position of the eye relative to the optics. In some embodiments, the information from the multiple cameras/sensors are combined using linear interpolation to determine the alignment offset.

In the embodiment illustrated in FIG. 5A, a camera or a sensor is disposed on each side of the rectangular visible field of view to determine the user's gaze direction and eye position in relation to the optical axis. It should be noted herein that the shape (i.e., rectangular shape) defining the visible field of view illustrated in FIGS. 5A-5I is exemplary and should not be considered restrictive. Other geometric shapes may be considered for representing the visible field of view and such geometric shapes may depend on the shape/size of the display screen disposed in the HMD. Further, the sensors are shown to be positioned in the middle of each section. The sensors can be positioned anywhere along each side, including a specific end of each side, etc.

FIG. 5B illustrates an embodiment wherein a pair of cameras/sensors are used for determining the user's eye position and the gaze direction in relation to the optical axis. In this embodiment, the cameras/sensors are disposed in the middle of the top side and the bottom side of the visible field of view. FIG. 5C illustrates another embodiment wherein the camera/sensor is disposed only on one side—in the middle of the bottom side of the visible field of view. FIG. 5D illustrates an alternate embodiment to the embodiment illustrated in FIG. 5B. In this embodiment, instead of the cameras/sensors being disposed in the middle of the bottom/top side of the visible field of view, the cameras/sensors are disposed in the middle of the left and right side of the visible field of view. In an alternate embodiment illustrated in FIG. 5E, the camera/sensor may be disposed only on the outer right/left side of the field of view, or on the inner right/left side of the field of view, as illustrated in the embodiment of FIG. 5F. In another alternate embodiment illustrated in FIG. 5G, the cameras/sensors may be disposed in the middle of only the right side of the visible field of view presented in front of each eye. In the exemplary embodiment illustrated in FIG. 5H, one camera/sensor can be disposed on one side of the visible field of view (for e.g., top side) defined in front of one eye and another camera can be disposed on the opposite side of the field of view defined in front of the other eye.

In an alternate embodiment illustrated in FIG. 5I, the cameras/sensors may be disposed around the visible field of view defined in front of one eye and the information may be used to apply any adjustment to the pre-distorted image presented for both the eyes. In this embodiment, movement related to only one eye is tracked and the information used for performing additional adjustment to the pre-distorted image before the image is sent to the HMD for rendering in front of both eyes. In an alternate embodiment, a camera/sensor in front of each eye may be used to determine the relative movement of each eye, determine if the user exhibits lazy eye on one side or if the movement of the left eye mirrors that of the right eye. Based on the determination, only one eye (for e.g., the eye that is moving, for a user who has a lazy eye) may be tracked to determine if additional adjustments need to be made to the pre-distorted image and apply the additional adjustments to the image presented in front of both the eyes. As can be seen, the cameras/sensors may be disposed on any side of the visible field of view in any configuration and the information captured by the camera is used to determine the alignment offset and to perform any adjustments to the image that is rendered in the display screen disposed in front of one or both eyes, based on the computed alignment offset.

Figure 6A:
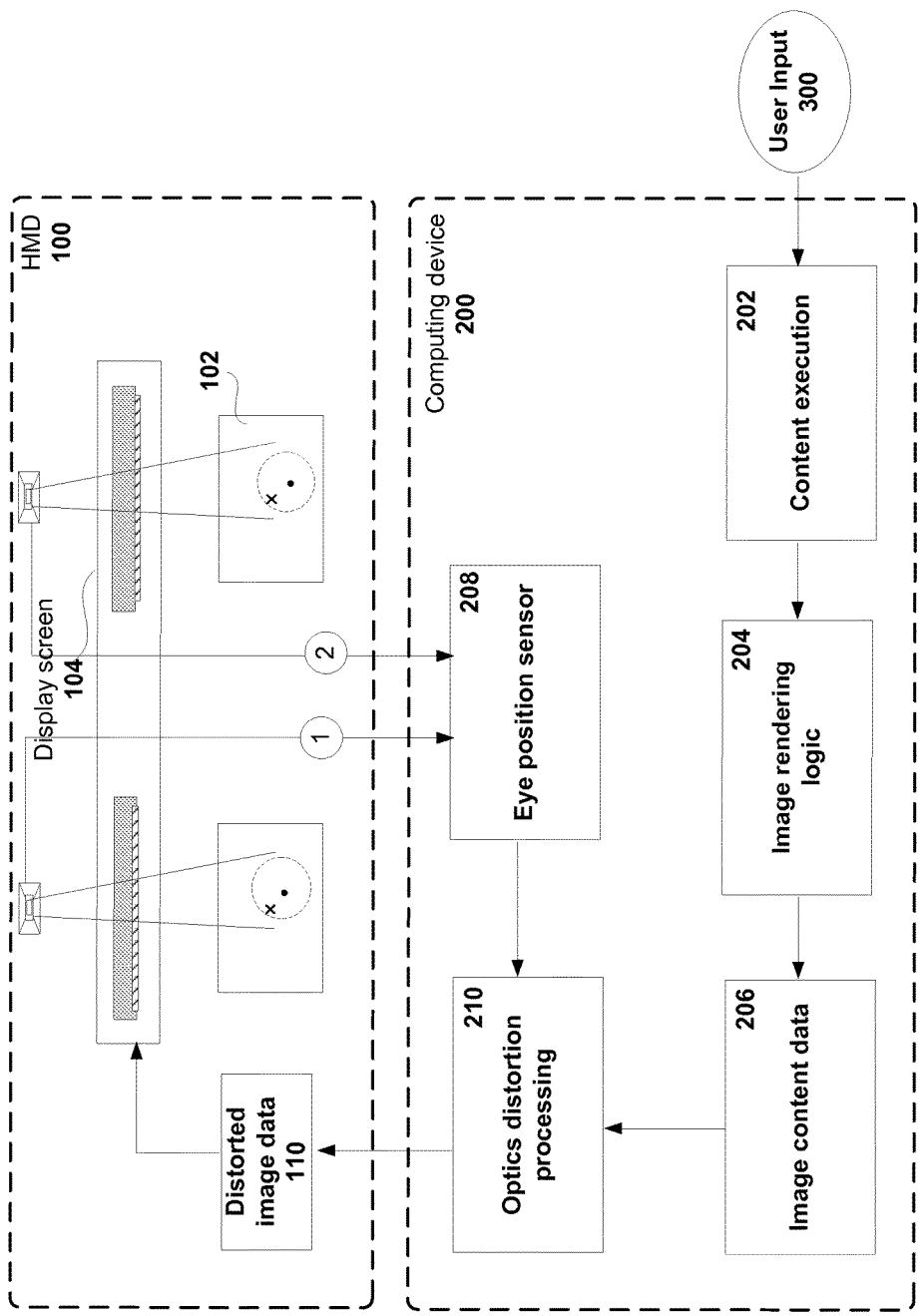
FIGS. 6A-6B illustrate an exemplary system architecture used for determining alignment offset of the eyes of a user wearing the HMD, in one embodiment of the invention.

FIG. 6A illustrates an exemplary system used for adjusting the pre-distorted image prior to the image being processed and rendered by the optics of the HMD. The adjustments are to address any aberrations that may be present due to misalignment of the user's eye(s) to the optical axis. The system identifies a plurality of modules that are engaged to provide adjustments to a pre-distorted image of content. In one embodiment illustrated in FIG. 6A, the system includes a HMD 100 and a computing device 200 that is communicatively connected to the HMD. As mentioned earlier, the computing device may be part of a network or a stand-alone computer or console. The connection between the computing device 200 and the HMD 100 may be through wired or wireless connection.

The HMD 100 is configured to receive and render the content provided by an application for user's consumption. Toward this end, the HMD 100 includes a display screen 104 that is used to render image content provided by the application, and optics 102 for processing the image content provided on the display screen for near-eye focus to allow the user wearing the HMD to view the image content clearly. The optics 102 is disposed between the display screen 104 and the user's eye(s). In one embodiment, the image forwarded to the display screen of the HMD is pre-distorted so that when the image is presented and viewed through the optics 102, the image appears sharp and clear.

The HMD 100 is also configured to capture and provide information, such as user's eye alignment information, etc., to the computing device 200 to allow the computing device to use the information and compute alignment offset (if any) of the user's eye(s) in relation to the optical axis. Toward this end, the HMD includes one or more cameras/sensors to capture information regarding the alignment of the eye(s) of the user in relation to the optical axis 102 provided in the HMD. The captured information, represented by bubbles 1 and 2 in FIG. 6A, is transmitted by the camera(s)/sensor(s) to the computing device 200 for processing.

The computing device 200 includes a plurality of modules for processing the information provided by the HMD and for providing pre-distorted image content for rendering on the display screen of the HMD. Some of the exemplary modules include content execution module 202, image rendering logic 204, image content data module 206, eye position sensor 208 and optics distortion processing module 210. The content execution module 202 is initiated in response to a user input 300. The user input 300 may be a selection of an application for execution and the content execution module 202 detects the user selection of the application and executes the selected application. Content from the executing application, including image content, is provided to the image rendering logic 204. The image rendering logic module 204 determines the type of optic(s) used in the HMD and the amount of distortion that needs to be applied to the image so that when the image is presented at the HMD, the optics will provide the necessary correction to the image for near-eye focus. The distortion data information for the specific optic is used to apply distortion to the image content data and the pre-distorted image content data is transmitted to the image content data module 206 where it is stored and from where it is retrieved for further processing. The optics distortion processing module 210 retrieves the pre-distorted image content data from the image content data module 206, receives the eye position data from the eye position sensor module 208, determines the alignment offset associated with the user's eye position, determines additional distortion that needs to be applied to the pre-distorted image content data based on the optics used in the HMD and applies the additional distortion to generate corrected, pre-distorted image data 110 that is presented to the HMD for rendering on the display screen 104 of the HMD. The process of determining eye position, computing alignment offset of the eye position in relation to the optical axis, and providing adjustment to the pre-distorted image may be executed using a circuitry, DSP (digital signal processing), software or combinations thereof, that is associated with a computer connected to the HMD, console (for e.g., game console), mobile phone/device, etc.

In one embodiment, the process of determining the eye position in relation to the optical axis of the HMD and adjusting the pre-distorted image data based on the eye position may be carried out continuously as long as the user is wearing the HMD and as long as the application is executing. In this embodiment, the position of the eye is continuously tracked to determine a new eye position or to verify the previously defined eye position, adjustments made to the pre-distorted image, and the corrected pre-distorted image is sent to the display screen at a frame rate at which the media content is being rendered on the display screen of the HMD. In another embodiment, the eye-tracking and distortion application process may be performed once before the image content data is rendered on the HMD, as part of an initialization step of the application or as part of a calibration step of the HMD, and repeated whenever a change in the eye-position is detected at the HMD.

In one embodiment, the alignment offset is computed by tracking the shift in the eye-position along the x-axis only. In another embodiment, the alignment offset is computed by tracking the eye-position shift along the y-axis only. In one other embodiment, the eye-position shift is tracked along the z-axis only. In another embodiment, the eye-position shift is tracked along the x and y axes only. In another embodiment, the eye-position shift is tracked along the x and z axes only. In another embodiment, the eye-position shift is tracked along the y and z axes only. In one embodiment, the eye-position shift is tracked along the x, y and z axes. As can be seen from the various embodiments, different axes shifts may be tracked and the image adjusted to provide a clear view of the image at the HMD. The amount of adjustment that needs to be made depend on the type of lens used in the optic. Additional information of how the additional distortion is applied to the image will be explained further with reference to FIG. 7.

In the embodiment illustrated in FIG. 6A, the process of applying additional distortion to the pre-distorted image is performed on the computing device 200 where the different modules are disposed. Using the computing device to process the eye position data and to apply the additional distortion may cause latency for rendering the image at the HMD and may depend on the communication link used.

Figure 6B:
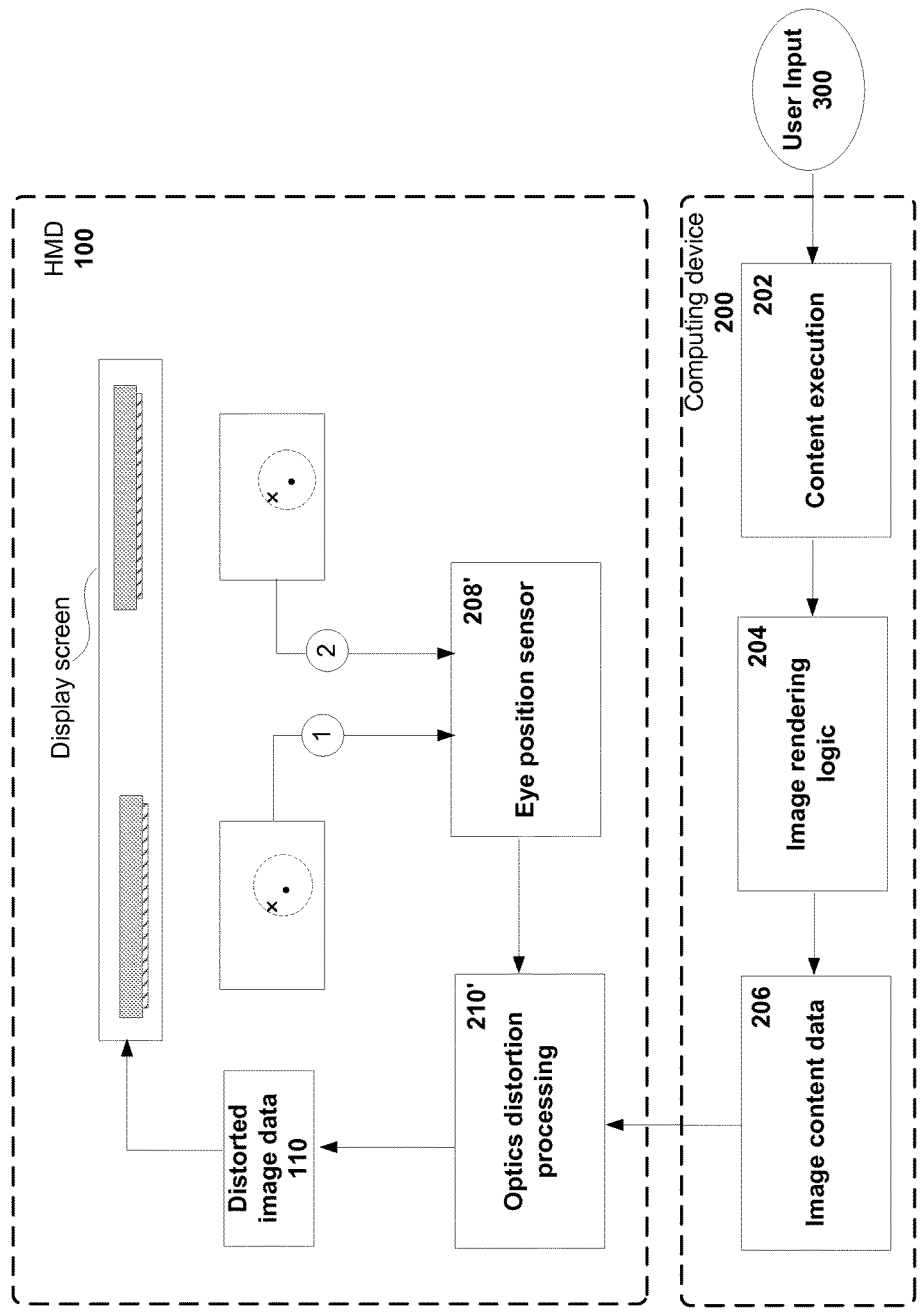

FIG. 6B illustrates an embodiment where part of the image processing is performed at the HMD. Processing at the HMD may be done to address the latency and to provide a high quality image at the HMD in a fast and efficient manner. In this embodiment, the eye position sensor module 208' and the optics distortion processing module 210' are provided in the HMD 100 instead of the computing device 200. The functionality of the eye position sensor module 208' and the distortion processing module 210' are similar to the corresponding ones that were provided in the computing device discussed in FIG. 6A. By providing the eye position sensor module 208' and the distortion processing module 210' within the HMD instead of the computing device, the application of additional distortion and rendering of image content data is faster as the alignment offset is computed locally within the eye position sensor module 208' and the pre-distorted image content data is adjusted locally by the optics distortion processing module 210' before it is presented on a display screen of the HMD and viewed through the optics.

Figure 7:
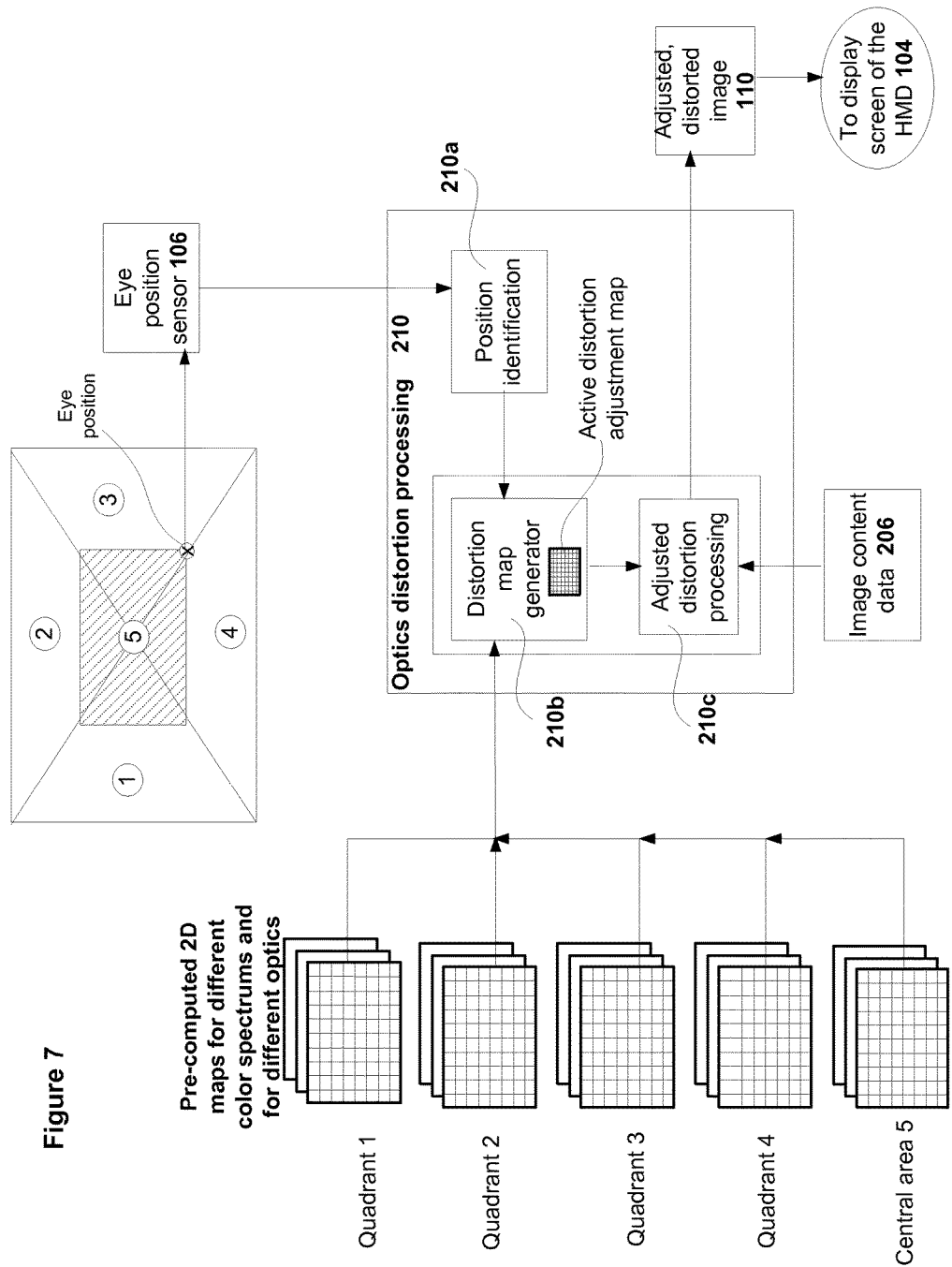
FIG. 7 illustrates a block diagram of an image distortion processing module used for determining the alignment offset of the eyes of a user and adjusting the pre-distorted image received from an application, in accordance with an embodiment of the invention.

FIG. 7 illustrates a process of generating an adjusted, distorted image data 110 by the optics distortion processing module 210. The process begins with the detection of the position of a user's eye(s) using one or more cameras or sensors 106. The user's eye position may be detected in response to the user wearing and/or activating the HMD, in response to the activation of an application, as part of the initialization step of the HMD or the application, etc. The eye position may be determined based on the relative position of the eye in relation to the optical axis. For a simple and faster determination of relative position of the eye in relation to the optical axis, the visible field of view of a display screen is divided into defined number of regions and the relative position of the eye is determined in relation to the defined regions. In one embodiment illustrated in FIG. 7, the field of view is divided into four quadrants, represented by bubbles 1-4 and a central area, illustrated by bubble 5. Each of the quadrant covers the farthest point within the field of view that the eye-position can shift in a particular direction. The number of regions and the areas covering the regions are exemplary and fewer or more regions may be defined in order to more precisely identify the eye position. The eye position sensor (for e.g., depth sensor, image sensor, camera, etc.) captures the eye position data in relation to the optical axis disposed within the HMD and provides this information to a position identification module 210a within the optics distortion processing module 210.

In one embodiment, the position identification module 210a uses the information provided by the eye position sensor 106 and determines the position of the eye in relation to the optical axis using data from the one or more regions. Information from the position identification module 210a is provided to a distortion map generator module 210b. The distortion map generator module 210b uses position data information from the position sensor module 210a, obtains information related to the type and shape of the optics used in the HMD, and identifies one or more pre-defined/pre-computed two dimensional (2D) distortion maps to precisely map the displacement in the eye position and to determine the distortion correction. The 2D distortion maps have been pre-defined based on optical simulation for each type and shape of optics used in the HMD and for each location in the field of view of the HMD. In the embodiment illustrated in FIG. 7, the eye-position may be determined by using data from quadrants 3, 4 and central region 5. In another embodiment, the eye-position may be determined by using data from all the regions (for e.g., quadrants 1-4 and central region 5). In yet another embodiment, the eye-position may be determine using data from quadrants 2-4 and the central region 5. In some other embodiment, the eye-position may be determined using data from only one region (quadrant 3, 4 or the central region 5). Irrespective of the number of regions used to determine the eye-position, the distortion map generator module 210b identifies one or more of the pre-computed/pre-defined two-dimensional (2D) maps and uses the identified maps for precisely determining the distortion correction that needs to be applied to the image content data 206.

To identify the appropriate maps, the distortion map generator module 210b first determines the shape and type of lens used in the optics of the HMD. There are different forms of aberrations that may be included in the rendered image due to the type and shape of the lens in the optics and the alignment offset of the user's eye position. For example, when spherical lens are used, the aberrations may be radial in nature. When aspherical lens are used, the aberrations may be geometric, straight-line, chromatic, or any combinations thereof. When holographic waveguide lens are used, the aberrations may be chromatic in nature. Chromatic aberrations may be caused when one or more of the red, green, blue color spectrum associated with the image are shifted and do not come into focus at the same point. Based on the optics used in the HMD, such aberrations need to be corrected by applying additional adjustment to provide a high quality image to a user. Accordingly, the 2D maps that are identified are based on the type and shape of optics selected for the HMD.

For each shape and type of optics, a distinct 2D map model is defined for each of the primary spectrum color used in rendering the image. These models define the amount of distortion that needs to be applied for each primary spectrum color in the image. For example, if the optics uses aspherical lens, then the 2D maps for each color associated with the aspherical lens are identified. Similarly, if the optics uses spherical lens or holographic waveguide lens, then the appropriate 2D maps for spherical or holographic waveguide lens are identified for each color. Additional 2D maps may be defined for different sizes and shapes of each type of optics. Therefore, specific ones of the 2D maps may be identified for a specific type of optics used in the HMD based on the size and shape of the optics.

The plurality of 2D maps associated with the type of optics are further filtered to include 2D maps related to specific regions identified by the position identification module 210a. Once the appropriate 2D maps are identified, the distortion map generator module performs a linear interpolation of the data from the plurality of identified 2D maps to generate a 2D active distortion adjustment map on-the-fly for the alignment offset defined in relation to the eye position. The data from the newly generated active distortion adjustment map is provided to the adjusted distortion processing module 210c (simply referred to as the "adjuster module"). The adjuster module 210c receives the image content data from the application as input. This image content data received at the adjuster module 210c is pre-distorted so that when the image is presented at the HMD, the optics will correct the distortion to present a clearer image to the user at near-eye focus. The adjuster module performs additional adjustment to the pre-distorted image to generate a corrected, pre-distorted image 110, based on the data provided in the newly generated active distortion adjustment map. The corrected, pre-distorted image data 110 is forwarded to the display screen of the HMD 104 for rendering. When the corrected, pre-distorted image data 110 is provided to the HMD, the optics on the HMD processes the image for near-eye focus to allow the user to view the image. The presented image removes aberrations caused by the alignment offset and is of higher quality.

The embodiments of the invention can be used to predict the movement of the user's eye and adjust the image data content based on the prediction. For example, there may be an activity, such as a landmine blowing, a lightning striking, a volcano erupting, a new email received, a social feed update received, etc., as part of the execution of the application and the image that is presented at one end of the visible field of view may capture the activity. Generally, such activities draw the user's attention and the user's eyes shift to this location to view the activity. Based on this prediction, a new map may be generated on-the-fly and the adjustment to the pre-distorted image performed in substantial real-time. In one embodiment, only the x-shift is determined for the eye-position, the new map generated for the x-shift and the adjustments made in accordance to the x-shift. In other embodiments, only the y-shift, only the z-shift, only the x-and-y shift, only the x-and-z shift, only the y-and-z shift, or x-y-z shift are determined and the new map generated in accordance to the detected shifts and the adjustments made in accordance to the detected axes shifts. By predicting a user's eye movement, the latency may be minimized. In some embodiments, the prediction of the user's eye movement is dependent on the content that is being rendered.

Figure 8:
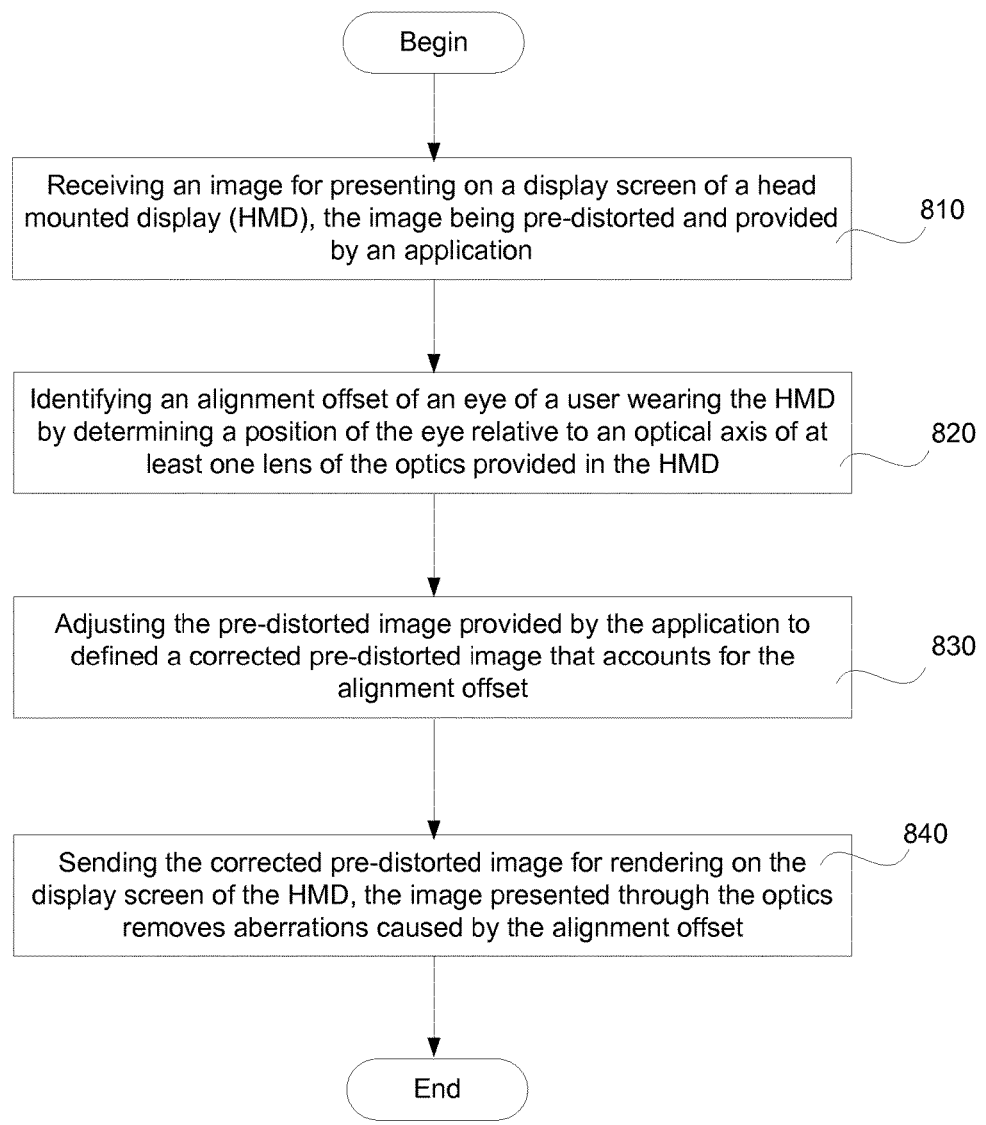
FIG. 8 illustrates exemplary process flow operations of a method for providing correction to a pre-distorted image, in accordance with an embodiment of the invention.

FIG. 8 illustrates various method operations of a method used to adjust an image received at a head mounted display. The method begins at operation 810 wherein an image is received for presenting on a display screen of a head mounted display. The image is provided by an application executing on a computing device communicatively connected to the HMD, in one embodiment, wherein the computing device may be a stand-alone computer or a networked computing device. The image provided by the application is pre-distorted before it is presented on the display screen of the HMD, so that the image when viewed through the optics provided in the HMD is presented for near-eye focus. An alignment offset of an eye of a user wearing the HMD is identified, as illustrated in operation 820. The alignment offset is identified by determining a position of the eye in relation to an optical axis of at least one lens of optics provided in the HMD. The pre-distorted image provided by the application is adjusted to account for the alignment offset, as illustrated in operation 830. The adjusting causes a corrected, pre-distorted image to be generated. The corrected, pre-distorted image is forwarded to the HMD for rendering on the display screen, as illustrated in operation 840. The corrected, pre-distorted image when viewed through the optics is clear and free of aberrations caused by the alignment offset.

Figure 9:
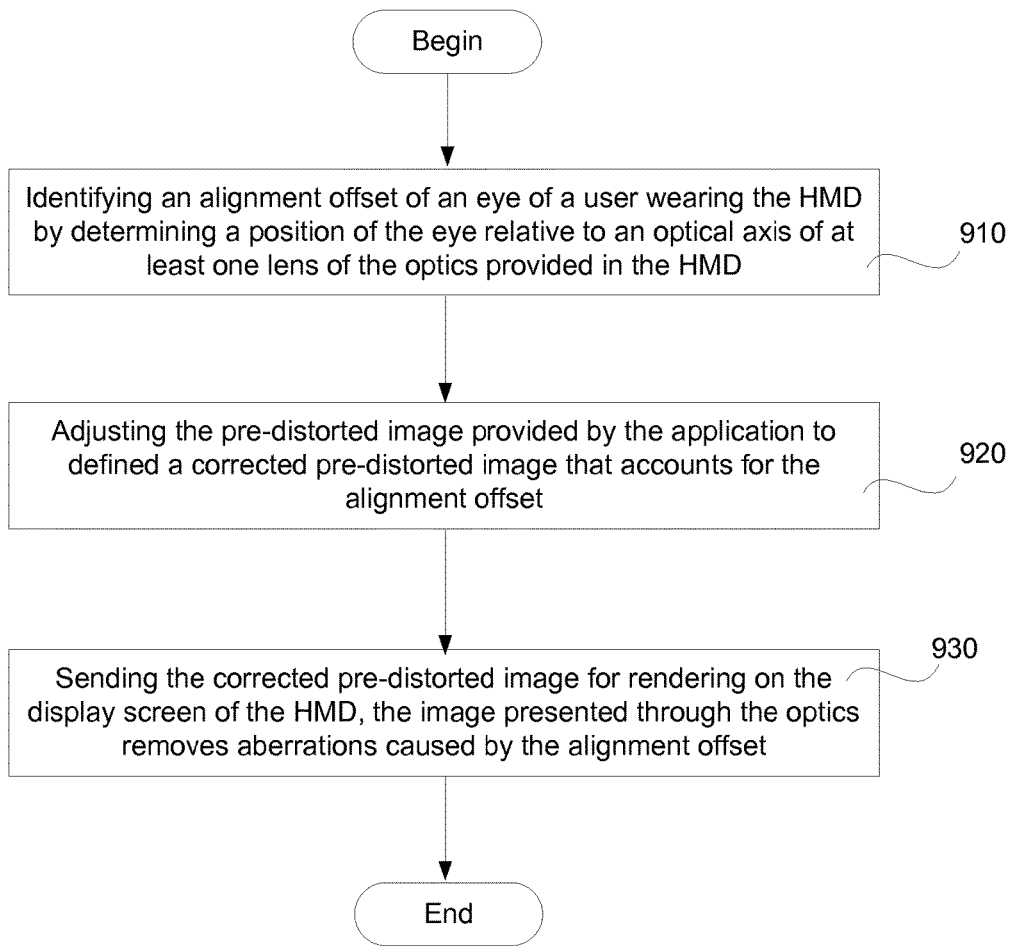
FIG. 9 illustrates exemplary process flow operations of a method for providing correction to a pre-distorted image, in accordance to an alternate embodiment of the invention.

FIG. 9 illustrates process flow operations of a method, in an alternate embodiment. The method begins at operation 910, wherein an alignment offset of an eye of a user wearing the HMD is identified. The alignment offset is identified by determining a position of the eye relative to an optical axis of at least one lens of optics provided in the HMD. A pre-distorted image of media content provided by an application for rendering on a display screen of the HMD, is adjusted, as illustrated in operation 920. The adjusting results in generation of a corrected, pre-distorted image that takes into consideration the alignment offset. The corrected, pre-distorted image is sent to the HMD for rendering on a display screen, as illustrated in operation 930. The image presented through the optics of the HMD is free of any aberrations caused by the alignment offset.

It should be noted that the eye position of the user needs to be set or defined in relation to the optics to enable a user to better view the content rendered on the display screen of the HMD. For example, this may include tracking the user's eye movement as the user follows an object on the display screen. Consequently, the frequency of detecting eye-position using linear interpolation and distortion adjustments depend on the amount of change detected in the eye-position of the user and may be performed, in some embodiments, based on the frame rate at which the image is refreshed on the display screen (i.e., screen refresh rate). In other embodiments, the adjustment can be done at half or a fraction of the screen refresh rate.

Figure 10:
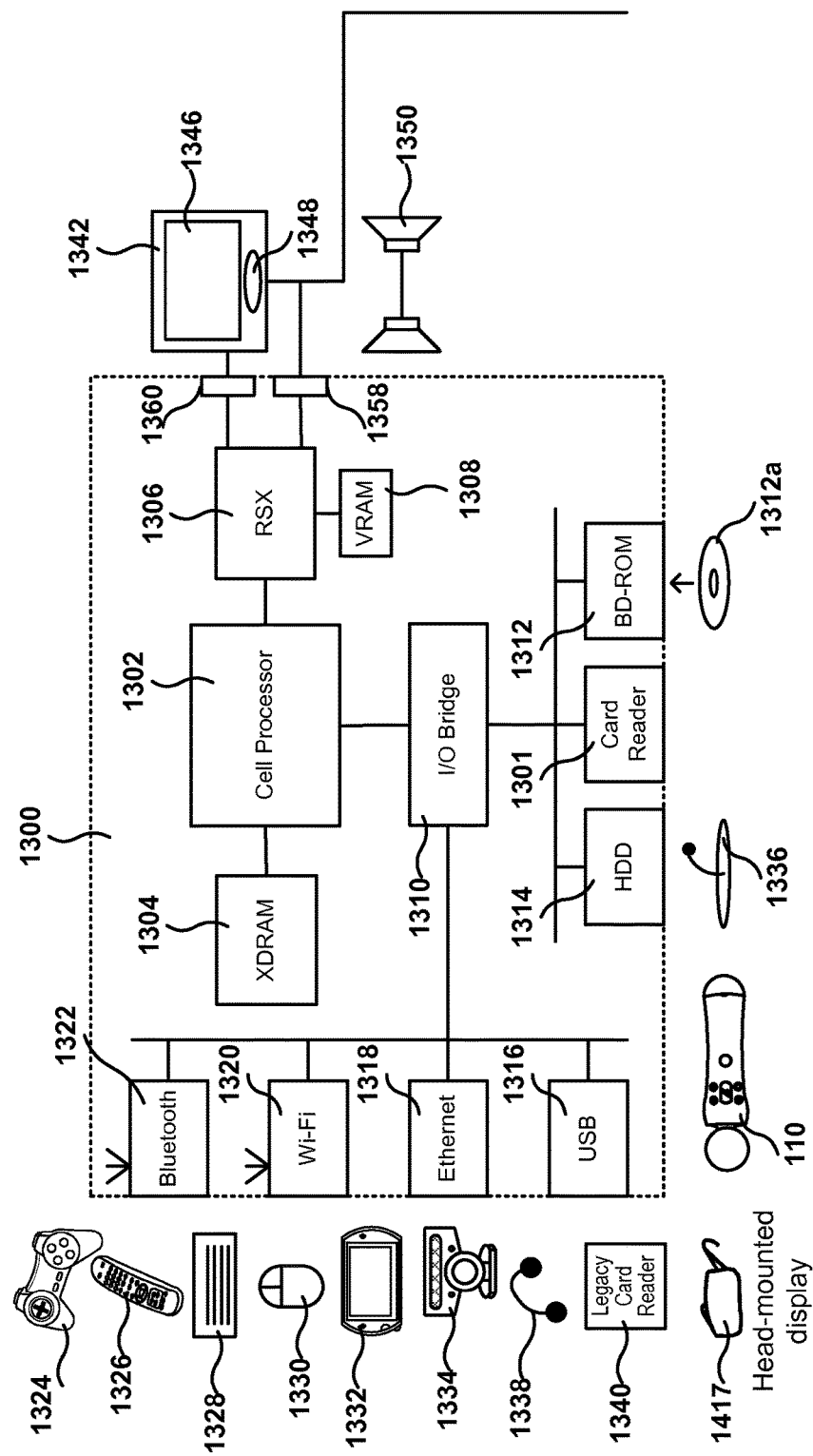
FIG. 10 illustrates overall system architecture of a game module, in one embodiment of the invention.

FIG. 10 illustrates hardware and user interfaces that may be used to implement some embodiments of the invention. FIG. 10 schematically illustrates the overall system architecture of the Sony® PlayStation 3® entertainment device. Other versions of PlayStation may include more or less features. A system unit 1300 is provided, with various peripheral devices connectable to the system unit 1300. The system unit 1300 includes: a Cell processor 1302; a Rambus® dynamic random access memory (XDRAM) unit 1304; a Reality Synthesizer graphics unit 1306 with a dedicated video random access memory (VRAM) unit 1308; and an I/O bridge 1310. The system unit 1300 also comprises a Blu Ray® Disk BD-ROM® optical disk reader 1312 for reading from a disk 1312a and a removable slot-in hard disk drive (HDD) 1314, accessible through the I/O bridge 1310. Optionally, the system unit 1300 also comprises a memory card reader 1301 for reading compact flash memory cards, Memory Stick® memory cards and the like, which is similarly accessible through the I/O bridge 1310.

The I/O bridge 1310 also connects to six Universal Serial Bus (USB) 2.0 ports 1316; a gigabit Ethernet port 1318; an IEEE 802.11b/g wireless network (Wi-Fi) port 1320; and a Bluetooth® wireless link port 1322 capable of supporting of up to seven Bluetooth connections.

In operation, the I/O bridge 1310 handles all wireless, USB and Ethernet data, including data from one or more game controllers 110 and 1324. For example, when a user is playing a game, the I/O bridge 1310 receives data from the game controller 110 and 1324 via a Bluetooth link and directs it to the Cell processor 1302, which updates the current state of the game accordingly.

The wireless, USB and Ethernet ports also provide connectivity for other peripheral devices in addition to game controllers 110 and 1324, such as: a remote control 1326; a keyboard 1328; a mouse 1330; a portable entertainment device 1332 such as a Sony PSP® entertainment device; a video camera such as a PlayStation®Eye Camera 1334; a shape object 1336; and a microphone 1338. Such peripheral devices may therefore in principle be connected to the system unit 1300 wirelessly; for example, the portable entertainment device 1332 may communicate via a Wi-Fi ad-hoc connection, while the shape object 1336 may communicate via a Bluetooth link.

The provision of these interfaces means that the PlayStation 3 device is also potentially compatible with other peripheral devices such as digital video recorders (DVRs), set-top boxes, digital cameras, portable media players, Voice over Internet Protocol (IP) telephones, mobile telephones, printers and scanners. In addition, a legacy memory card reader 1340 may be connected to the system unit via a USB port 1316, enabling the reading of memory cards of the kind used by the PlayStation® or PlayStation 2® devices.

The game controllers 110 and 1324 are operable to communicate wirelessly with the system unit 1300 via the Bluetooth link, or to be connected to a USB port, thereby also providing power by which to charge the battery of the game controllers 110 and 1324. Game controllers 110 and

1324 can also include memory, a processor, a memory card reader, permanent memory such as flash memory, light emitters such as an illuminated spherical section, light emitting diodes (LEDs), or infrared lights, microphone and speaker for ultrasound communications, an acoustic chamber, a digital camera, an internal clock, a recognizable shape facing the game console, and wireless communications using protocols such as Bluetooth®, WiFi™, etc. The recognizable shape can be in a shape substantially of a sphere, a cube, parallelogram, a rectangular parallelepiped, a cone, a pyramid, a soccer ball, a football or rugby ball, an imperfect sphere, a section of a sphere, a truncated pyramid, a truncated cone, a baseball bat, a truncated cube, a polyhedron, a star, etc., or a combination of two of more of these shapes.

Game controller 1324 is a controller designed to be used with two hands, and game controller 110 is a single-hand controller with a ball attachment. In addition to one or more analog joysticks and conventional control buttons, the game controller is susceptible to three-dimensional location determination. Consequently gestures and movements by the user of the game controller may be translated as inputs to a game in addition to or instead of conventional button or joystick commands. Optionally, other wirelessly enabled peripheral devices such as the Sony PSP® portable device may be used as a controller. In the case of the Sony PSP® portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 1326 is also operable to communicate wirelessly with the system unit 1300 via a Bluetooth link. The remote control 1326 comprises controls suitable for the operation of the Blu Ray™ Disk BD-ROM reader 1312 and for the navigation of disk content.

The Blu Ray™ Disk BD-ROM reader 1312 is operable to read CD-ROMs compatible with the PlayStation and PlayStation 2 devices, in addition to conventional pre-recorded and recordable CDs, and so-called Super Audio CDs. The reader 1312 is also operable to read DVD-ROMs compatible with the Playstation 2 and PlayStation 3 devices, in addition to conventional pre-recorded and recordable DVDs. The reader 1312 is further operable to read BD-ROMs compatible with the PlayStation 3 device, as well as conventional pre-recorded and recordable Blu-Ray Disks.

The system unit 1300 is operable to supply audio and video, either generated or decoded by the PlayStation 3 device via the Reality Synthesizer graphics unit (RSX) 1306, through audio and video connectors to a display and sound output device 1342 such as a monitor or television set having a display 1346 and one or more loudspeakers 1348, or stand-alone speakers 1350. In one embodiment, voice and gaze inputs are utilized to play sound toward specific audio speakers according to the POG of the user. The audio connectors 1358 may include conventional analogue and digital outputs while the video connectors 1360 may variously include component video, S-video, composite video and one or more High Definition Multimedia Interface (HDMI) outputs. Consequently, video output may be in formats such as PAL or NTSC, or in 720p, 1080i or 1080p high definition.

Audio processing (generation, decoding and so on) is performed by the Cell processor 1302. The PlayStation 3 device's operating system supports Dolby® 5.1 surround sound, Dolby® Theatre Surround (DTS), and the decoding of 7.1 surround sound from Blu-Ray® disks.

In the present embodiment, the video camera 1334 comprises a single Charge Coupled Device (CCD), an LED indicator, and hardware-based real-time data compression and encoding apparatus so that compressed video data may be transmitted in an appropriate format such as an intra-image based MPEG (motion picture expert group) standard for decoding by the system unit 1300. The camera LED indicator is arranged to illuminate in response to appropriate control data from the system unit 1300, for example to signify adverse lighting conditions. Embodiments of the video camera 1334 may variously connect to the system unit 1300 via a USB, Bluetooth or Wi-Fi communication port. Embodiments of the video camera may include one or more associated microphones and also be capable of transmitting audio data. In embodiments of the video camera, the CCD may have a resolution suitable for high-definition video capture. In use, images captured by the video camera may, for example, be incorporated within a game or interpreted as game control inputs. In another embodiment, the camera is an infrared camera suitable for detecting infrared light.

In general, in order for successful data communication to occur with a peripheral device such as a video camera or remote control via one of the communication ports of the system unit 1300, an appropriate piece of software such as a device driver should be provided. Device driver technology is well-known and will not be described in detail here, except to say that the skilled man will be aware that a device driver or similar software interface may be required in the present embodiment described.

Figure 11:
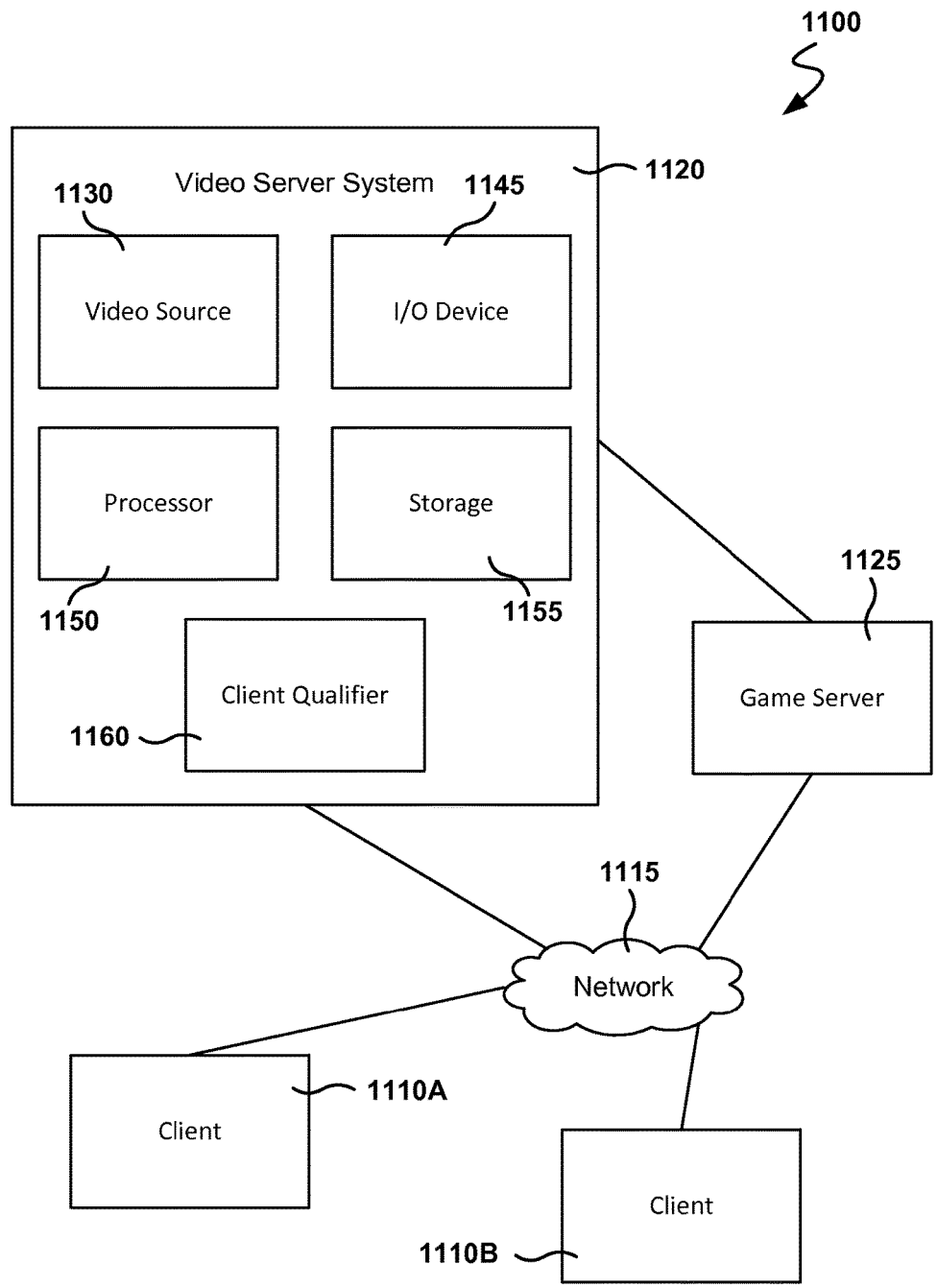
FIG. 11 illustrates a block diagram of a game system, in accordance with an embodiment of the invention.

FIG. 11 is a block diagram of a Game System 1100, according to various embodiments of the invention. Game System 1100 is configured to provide a video stream to one or more Clients 1110 via a Network 1115. Game System 1100 typically includes a Video Server System 1120 and an optional game server 1125. Video Server System 1120 is configured to provide the video stream to the one or more Clients 1110 with a minimal quality of service. For example, Video Server System 1120 may receive a game command that changes the state of or a point of view within a video game, and provide Clients 1110 with an updated video stream reflecting this change in state with minimal lag time. The Video Server System 1120 may be configured to provide the video stream in a wide variety of alternative video formats, including formats yet to be defined. Further, the video stream may include video frames configured for presentation to a user at a wide variety of frame rates. Typical frame rates are 30 frames per second, 60 frames per second, and 120 frames per second. Although higher or lower frame rates are included in alternative embodiments of the invention.

Clients 1110, referred to herein individually as 1110A, 1110B, etc., may include head mounted displays, terminals, personal computers, game consoles, tablet computers, telephones, set top boxes, kiosks, wireless devices, digital pads, stand-alone devices, handheld game playing devices, and/or the like. Typically, Clients 1110 are configured to receive encoded video streams, decode the video streams, and present the resulting video to a user, e.g., a player of a game. The processes of receiving encoded video streams and/or decoding the video streams typically includes storing individual video frames in a receive buffer of the client. The video streams may be presented to the user on a display integral to Client 1110 or on a separate device such as a monitor or television. Clients 1110 are optionally configured to support more than one game player. For example, a game console may be configured to support two, three, four or more simultaneous players. Each of these players may receive a separate video stream, or a single video stream may include regions of a frame generated specifically for each player, e.g., generated based on each player's point of view. Clients 1110 are optionally geographically dispersed. The number of clients included in Game System 1100 may vary widely from one or two to thousands, tens of thousands, or more. As used herein, the term "game player" is used to refer to a person that plays a game and the term "game playing device" is used to refer to a device used to play a game. In some embodiments, the game playing device may refer to a plurality of computing devices that cooperate to deliver a game experience to the user. For example, a game console and an HMD may cooperate with the video server system 1120 to deliver a game viewed through the HMD. In one embodiment, the game console receives the video stream from the video server system 1120, and the game console forwards the video stream, or updates to the video stream, to the HMD for rendering.

Clients 1110 are configured to receive video streams via Network 1115. Network 1115 may be any type of communication network including, a telephone network, the Internet, wireless networks, powerline networks, local area networks, wide area networks, private networks, and/or the like. In typical embodiments, the video streams are communicated via standard protocols, such as TCP/IP or UDP/IP. Alternatively, the video streams are communicated via proprietary standards.

A typical example of Clients 1110 is a personal computer comprising a processor, non-volatile memory, a display, decoding logic, network communication capabilities, and input devices. The decoding logic may include hardware, firmware, and/or software stored on a computer readable medium. Systems for decoding (and encoding) video streams are well known in the art and vary depending on the particular encoding scheme used.

Clients 1110 may, but are not required to, further include systems configured for modifying received video. For example, a client may be configured to perform further rendering, to overlay one video image on another video image, to crop a video image, and/or the like. For example, Clients 1110 may be configured to receive various types of video frames, such as I-frames, P-frames and B-frames, and to process these frames into images for display to a user. In some embodiments, a member of Clients 1110 is configured to perform further rendering, shading, conversion to 3-D, or like operations on the video stream. A member of Clients 1110 is optionally configured to receive more than one audio or video stream. Input devices of Clients 1110 may include, for example, a one-hand game controller, a two-hand game controller, a gesture recognition system, a gaze recognition system, a voice recognition system, a keyboard, a joystick, a pointing device, a force feedback device, a motion and/or location sensing device, a mouse, a touch screen, a neural interface, a camera, input devices yet to be developed, and/or the like.

The video stream (and optionally audio stream) received by Clients 1110 is generated and provided by Video Server System 1120. As is described further elsewhere herein, this video stream includes video frames (and the audio stream includes audio frames). The video frames are configured (e.g., they include pixel information in an appropriate data structure) to contribute meaningfully to the images displayed to the user. As used herein, the term "video frames" is used to refer to frames including predominantly information that is configured to contribute to, e.g. to effect, the images shown to the user. Most of the teachings herein with regard to "video frames" can also be applied to "audio frames."

Clients 1110 are typically configured to receive inputs from a user. These inputs may include game commands configured to change the state of the video game or otherwise affect game play. The game commands can be received using input devices and/or may be automatically generated by computing instructions executing on Clients 1110. The received game commands are communicated from Clients 1110 via Network 1115 to Video Server System 1120 and/or Game Server 1125. For example, in some embodiments, the game commands are communicated to Game Server 1125 via Video Server System 1120. In some embodiments, separate copies of the game commands are communicated from Clients 1110 to Game Server 1125 and Video Server System 1120. The communication of game commands is optionally dependent on the identity of the command. Game commands are optionally communicated from Client 1110A through a different route or communication channel that that used to provide audio or video streams to Client 1110A.

Game Server 1125 is optionally operated by a different entity than Video Server System 1120. For example, Game Server 1125 may be operated by the publisher of a multi-player game. In this example, Video Server System 1120 is optionally viewed as a client by Game Server 1125 and optionally configured to appear from the point of view of Game Server 1125 to be a prior art client executing a prior art game engine. Communication between Video Server System 1120 and Game Server 1125 optionally occurs via Network 1115. As such, Game Server 1125 can be a prior art multiplayer game server that sends game state information to multiple clients, one of which is game server system 1120. Video Server System 1120 may be configured to communicate with multiple instances of Game Server 1125 at the same time. For example, Video Server System 1120 can be configured to provide a plurality of different video games to different users. Each of these different video games may be supported by a different Game Server 1125 and/or published by different entities. In some embodiments, several geographically distributed instances of Video Server System 1120 are configured to provide game video to a plurality of different users. Each of these instances of Video Server System 1120 may be in communication with the same instance of Game Server 1125. Communication between Video Server System 1120 and one or more Game Server 1125 optionally occurs via a dedicated communication channel. For example, Video Server System 1120 may be connected to Game Server 1125 via a high bandwidth channel that is dedicated to communication between these two systems.

Video Server System 1120 comprises at least a Video Source 1130, an I/O Device 1145, a Processor 1150, and non-transitory Storage 1155. Video Server System 1120 may include one computing device or be distributed among a plurality of computing devices. These computing devices are optionally connected via a communications system such as a local area network.

Video Source 1130 is configured to provide a video stream, e.g., streaming video or a series of video frames that form a moving picture. In some embodiments, Video Source 1130 includes a video game engine and rendering logic. The video game engine is configured to receive game commands from a player and to maintain a copy of the state of the video game based on the received commands. This game state includes the position of objects in a game environment, as well as typically a point of view. The game state may also include properties, images, colors and/or textures of objects. The game state is typically maintained based on game rules, as well as game commands such as move, turn, attack, set focus to, interact, use, and/or the like. Part of the game engine is optionally disposed within Game Server 1125. Game Server 1125 may maintain a copy of the state of the game based on game commands received from multiple players using geographically disperse clients. In these cases, the game state is provided by Game Server 1125 to Video Source 1130, wherein a copy of the game state is stored and rendering is performed. Game Server 1125 may receive game commands directly from Clients 1110 via Network 1115, and/or may receive game commands via Video Server System 1120.

Video Source 1130 typically includes rendering logic, e.g., hardware, firmware, and/or software stored on a computer readable medium such as Storage 1155. This rendering logic is configured to create video frames of the video stream based on the game state. All or part of the rendering logic is optionally disposed within a graphics processing unit (GPU). Rendering logic typically includes processing stages configured for determining the three-dimensional spatial relationships between objects and/or for applying appropriate textures, etc., based on the game state and viewpoint. The rendering logic produces raw video that is then usually encoded prior to communication to Clients 1110. For example, the raw video may be encoded according to an Adobe Flash® standard, .wav, H.264, H.263, On2, VP6, VC-1, WMA, Huffyuv, Lagarith, MPG-x. Xvid. FFmpeg, x264, VP6-8, realvideo, mp3, or the like. The encoding process produces a video stream that is optionally packaged for delivery to a decoder on a remote device. The video stream is characterized by a frame size and a frame rate. Typical frame sizes include 800×600, 1280×720 (e.g., 720p), 1024×768, although any other frame sizes may be used. The frame rate is the number of video frames per second. A video stream may include different types of video frames. For example, the H.264 standard includes a "P" frame and a "I" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame.

In alternative embodiments Video Source 1130 includes a video recording device such as a camera. This camera may be used to generate delayed or live video that can be included in the video stream of a computer game. The resulting video stream, optionally includes both rendered images and images recorded using a still or video camera. Video Source 1130 may also include storage devices configured to store previously recorded video to be included in a video stream. Video Source 1130 may also include motion or positioning sensing devices configured to detect motion or position of an object, e.g., person, and logic configured to determine a game state or produce video-based on the detected motion and/or position.

Video Source 1130 is optionally configured to provide overlays configured to be placed on other video. For example, these overlays may include a command interface, log in instructions, messages to a game player, images of other game players, video feeds of other game players (e.g., webcam video). In embodiments of Client 1110A including a touch screen interface or a gaze detection interface, the overlay may include a virtual keyboard, joystick, touch pad, and/or the like. In one example of an overlay a player's voice is overlaid on an audio stream. Video Source 1130 optionally further includes one or more audio sources.

In embodiments wherein Video Server System 1120 is configured to maintain the game state based on input from more than one player, each player may have a different point of view comprising a position and direction of view. Video Source 1130 is optionally configured to provide a separate video stream for each player based on their point of view. Further, Video Source 1130 may be configured to provide a different frame size, frame data size, and/or encoding to each of Client 1110. Video Source 1130 is optionally configured to provide 3-D video.

I/O Device 1145 is configured for Video Server System 1120 to send and/or receive information such as video, commands, requests for information, a game state, gaze information, device motion, device location, user motion, client identities, player identities, game commands, security information, audio, and/or the like. I/O Device 1145 typically includes communication hardware such as a network card or modem. I/O Device 1145 is configured to communicate with Game Server 1125, Network 1115, and/or Clients 1110.

Processor 1150 is configured to execute logic, e.g. software, included within the various components of Video Server System 1120 discussed herein. For example, Processor 1150 may be programmed with software instructions in order to perform the functions of Video Source 1130, Game Server 1125, and/or a Client Qualifier 1160. Video Server System 1120 optionally includes more than one instance of Processor 1150. Processor 1150 may also be programmed with software instructions in order to execute commands received by Video Server System 1120, or to coordinate the operation of the various elements of Game System 1100 discussed herein. Processor 1150 may include one or more hardware device. Processor 1150 is an electronic processor.

Storage 1155 includes non-transitory analog and/or digital storage devices. For example, Storage 1155 may include an analog storage device configured to store video frames. Storage 1155 may include a computer readable digital storage, e.g. a hard drive, an optical drive, or solid state storage. Storage 1115 is configured (e.g. by way of an appropriate data structure or file system) to store video frames, artificial frames, a video stream including both video frames and artificial frames, audio frame, an audio stream, and/or the like. Storage 1155 is optionally distributed among a plurality of devices. In some embodiments, Storage 1155 is configured to store the software components of Video Source 1130 discussed elsewhere herein. These components may be stored in a format ready to be provisioned when needed.

Video Server System 1120 optionally further comprises Client Qualifier 1160. Client Qualifier 1160 is configured for remotely determining the capabilities of a client, such as Clients 1110A or 1110B. These capabilities can include both the capabilities of Client 1110A itself as well as the capabilities of one or more communication channels between Client 1110A and Video Server System 1120. For example, Client Qualifier 1160 may be configured to test a communication channel through Network 1115.

Client Qualifier 1160 can determine (e.g., discover) the capabilities of Client 1110A manually or automatically. Manual determination includes communicating with a user of Client 1110A and asking the user to provide capabilities. For example, in some embodiments, Client Qualifier 1160 is configured to display images, text, and/or the like within a browser of Client 1110A. In one embodiment, Client 1110A is an HMD that includes a browser. In another embodiment, client 1110A is a game console having a browser, which may be displayed on the HMD. The displayed objects request that the user enter information such as operating system, processor, video decoder type, type of network connection, display resolution, etc. of Client 1110A. The information entered by the user is communicated back to Client Qualifier 1160.

Automatic determination may occur, for example, by execution of an agent on Client 1110A and/or by sending test video to Client 1110A. The agent may comprise computing instructions, such as java script, embedded in a web page or installed as an add-on. The agent is optionally provided by Client Qualifier 1160. In various embodiments, the agent can find out processing power of Client 1110A, decoding and display capabilities of Client 1110A, lag time reliability and bandwidth of communication channels between Client 1110A and Video Server System 1120, a display type of Client 1110A, firewalls present on Client 1110A, hardware of Client 1110A, software executing on Client 1110A, registry entries within Client 1110A, and/or the like.

Client Qualifier 1160 includes hardware, firmware, and/or software stored on a computer readable medium. Client Qualifier 1160 is optionally disposed on a computing device separate from one or more other elements of Video Server System 1120. For example, in some embodiments, Client Qualifier 1160 is configured to determine the characteristics of communication channels between Clients 1110 and more than one instance of Video Server System 1120. In these embodiments the information discovered by Client Qualifier can be used to determine which instance of Video Server System 1120 is best suited for delivery of streaming video to one of Clients 1110.

Embodiments of the present invention may be practiced with various computer system configurations including hand-held devices, microprocessor systems, microprocessor-based or programmable consumer electronics, minicomputers, mainframe computers and the like. Several embodiments of the present invention can also be practiced in distributed computing environments where tasks are performed by remote processing devices that are linked through a wire-based or wireless network.

With the above embodiments in mind, it should be understood that a number of embodiments of the present invention can employ various computer-implemented operations involving data stored in computer systems. These operations are those requiring physical manipulation of physical quantities. Any of the operations described herein that form part of various embodiments of the present invention are useful machine operations. Several embodiments of the present invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

Various embodiments of the present invention can also be embodied as computer readable code on a computer readable medium. The computer readable medium is any data storage device that can store data, which can be thereafter be read by a computer system. Examples of the computer readable medium include hard drives, network attached storage (NAS), read-only memory (ROM), random-access memory, compact disc-ROMs (CD-ROMs), CD-recordables (CD-Rs), CD-rewritables (RWs), magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the various embodiments of the present invention is not to be limited to the details given herein, but may be modified within the scope and equivalents of the appended claims.

The invention claimed is:

1. A method, comprising:
   a) identifying a position of an eye of a user wearing a head mounted display (HMD), the position of the eye used in determining an alignment offset of the eye relative to an optical axis of at least one lens of optics provided in the HMD;
   b) predicting a shift in the position of the eye of the user based on media content that is being rendered on a display screen of the HMD, wherein image of the media content is pre-distorted to enable the optics of the HMD to render the image;
   c) selecting pre-defined distortion maps to determine a specific distortion correction for the alignment offset, the pre-defined distortion maps are selected to correspond with a location where the position of the eye is predicted to shift;
   d) adjusting the image of the media content that is pre-distorted by applying the specific distortion correction to generate a corrected image that accounts for the alignment offset, wherein an amount of adjusting for the alignment offset is determined from the one or more pre-defined distortion maps selected for a shape and a type of lens used in the optics of the HMD; and
   e) sending the corrected image for rendering on the display screen of the HMD when the shift in the position of the eye of the user is detected, such that the image when viewed through the optics is devoid of aberration caused by the alignment offset.

2. The method of claim 1, wherein selecting the pre-defined distortion maps further includes performing a linear interpolation of data from the pre-defined distortion maps selected for the location where the position of the eye is predicted to shift, to generate a distortion adjustment map in substantial real-time, the distortion adjustment map used in determining the specific distortion correction.

3. The method of claim 1, wherein the adjusting of the image is done in substantial real-time, based on the predicted shift.

4. The method of claim 1, wherein the pre-defined distortion maps are two dimensional maps.

5. The method of claim 1, wherein the pre-defined distortion maps are generated by performing optical simulation for each type and shape of optics used in the HMD.

6. The method of claim 5, wherein the pre-defined distortion maps are defined for each color in a primary color spectrum used in rendering the image.

7. The method of claim 1, wherein the pre-defined distortion maps provide mapping of different locations within a visible field of view of the display screen of the HMD to corresponding alignment offsets.

8. The method of claim 1, wherein operations b) through e) are performed during rendering of frames of the media content included in the image.

9. The method of claim 1, wherein operations b) through e) are performed at a frame rate of frames of the media content rendered at the HMD.

10. The method of claim 1, wherein identifying the alignment offset includes identifying one of an x-shift, or a y-shift, or a z-shift, or an x-and-y shift, or an x-and-z shift, or a y-and-z shift, or an x-y-z shift.

11. The method of claim 1, wherein the position of the eye is captured using one or more internal sensors disposed on the HMD.

12. The method of claim 1, wherein the shift in the position of the eye of the user is predicted based on an activity occurring in an application providing the media content and the image of the media content rendered at the HMD captures the activity.

13. The method of claim 1, wherein identifying the alignment offset includes tracking the position of the eye in substantial real-time as the image is being presented on the display screen of the HMD.

14. A head mounted display device, comprising:
a lens of optics for viewing a pre-distorted image of multimedia content rendered on a display screen of the head mounted display (HMD);
an eye position sensor configured to,
(a) determine position of an eye of a user wearing the HMD in relation to an optical axis of the lens of optics provided in the HMD;
(b) determine alignment offset of the eye of the user; and
an optics distortion processor configured to,
(c) predict a shift in the position of the eye of the user based on the multimedia content being rendered on the display screen;
(d) select pre-defined distortion maps for a type and shape of lens used in the optics, the pre-defined distortion maps selected correspond with a location where the position of the eye is predicted to shift and are used to determine a specific distortion correction for the alignment offset;
(e) adjust the pre-distorted image of multimedia content provided for rendering on the display screen of the HMD by applying the specific distortion correction to generate a corrected image that accounts for the alignment offset, wherein an amount of adjusting for the alignment offset is determined from the pre-defined distortion maps, wherein the corrected image of the multimedia content is transmitted to the display screen of the HMD for rendering when the shift in the position of the eye of the user is detected.

15. The head mounted display device of claim 14, wherein the eye position sensor includes a position tracker to track the position of the eye of the user so as to perform adjustment to the pre-distorted image in substantial real-time based on tracking information provided by the position tracker.

16. The head mounted display device of claim 14, wherein the pre-defined distortion maps are generated based on optical simulation for each type and shape of lens of the optics used in the HMD.

17. The head mounted display device of claim 14, wherein the shift in the position of the eye is predicted based on an activity occurring in an application providing the multimedia content and the image of the multimedia content rendered at the HMD captures the activity.

* * * * *